(12) United States Patent
Roeckle (10) Patent No.: US 8,607,729 B2
(45) Date of Patent: Dec. 17, 2013

(54) DIP COATING LINE

(75) Inventor: Juergen Roeckle, Magstadt (DE)

(73) Assignee: Eisenmann AG (DE)

( * ) Notice: Subject to any disclaimer, the term of this patent is extended or adjusted under 35 U.S.C. 154(b) by 26 days.

(21) Appl. No.: 13/264,630

(22) PCT Filed: Mar. 20, 2010

(86) PCT No.: PCT/EP2010/001756
§ 371 (c)(1),
(2), (4) Date: Dec. 21, 2011

(87) PCT Pub. No.: WO2010/121688
PCT Pub. Date: Oct. 28, 2010

(65) Prior Publication Data
US 2012/0097099 A1 Apr. 26, 2012

(30) Foreign Application Priority Data
Apr. 15, 2009 (DE) .......................... 10 2009 017 151

(51) Int. Cl.
*B05D 3/12* (2006.01)
*B05C 11/00* (2006.01)

(52) U.S. Cl.
USPC ............................ 118/423; 118/429; 118/712

(58) Field of Classification Search
USPC ........... 118/423, 500, 416, 322, 320, 314, 52, 118/66, 663, 686, 687, 426–429, 712, 713; 204/512, 623; 340/436, 901; 427/242, 427/435, 425, 430.1
See application file for complete search history.

(56) References Cited

U.S. PATENT DOCUMENTS

| 4,904,365 A | * | 2/1990 | Kawamura et al. ........... 204/623 |
| 6,419,983 B1 | | 7/2002 | Kreuzer |
| 7,026,015 B2 | * | 4/2006 | Kreuzer ........................ 427/425 |
| 2003/0056723 A1 | | 3/2003 | Ehrenleitner et al. |
| 2010/0200416 A1 | * | 8/2010 | Hagihara et al. .............. 205/205 |
| 2011/0106361 A1 | | 5/2011 | Staempfle et al. |

FOREIGN PATENT DOCUMENTS

| DE | 85 35 671 U1 | 5/1989 |
| DE | 196 41 048 A1 | 4/1998 |

(Continued)

OTHER PUBLICATIONS

Search report dated Jul. 28, 2010 for International Application No. PCT/EP2010/001756 (2 pages).

*Primary Examiner* — Yewebdar Tadesse
(74) *Attorney, Agent, or Firm* — Factor Intellectual Property Law Group, Ltd.

(57) ABSTRACT

A line for the dip coating of objects operates with a known conveyor system. In order to avoid a collision between the objects and the hard structure adjoining the movement path, a position transducer measuring the absolute value is provided for each possible degree of freedom of movement of the object fixed to the holding frame. The course of a first boundary surface or a boundary line, which reproduces the course of the hard structures along the movement path of the object, is stored in a memory. Also stored is the course of a second boundary surface or boundary line, which runs at a distance from the first boundary surface or boundary line. Finally, the course of a contour which represents the course of the object fixed to the holding frame is also stored. The control device calculates, from the signals supplied to it by the position transducers and the other stored data, whether the contour representing the object fixed to the holding frame intersects the second boundary surface or boundary line or not and, in the first case, interrupts immediately the further movement of the object.

14 Claims, 4 Drawing Sheets

(56) References Cited

FOREIGN PATENT DOCUMENTS

| DE | 100 29 939 C1 | 10/2001 |
| DE | 101 03 387 A1 | 9/2002 |
| DE | 102 26 140 A1 | 1/2004 |
| DE | 10 2007 013 303 A1 | 9/2008 |
| WO | 2008/031700 A1 | 3/2008 |

* cited by examiner

DIP COATING LINE

RELATED APPLICATIONS

This application claims the filing benefit of International Patent Application No. PCT/EP2010/001756, filed Mar. 20, 2010, which claims the filing benefit of German Patent Application No. 10 2009 017 151.7 filed Apr. 15, 2009, the contents of which are incorporated herein by reference.

TECHNICAL FIELD

The invention relates to a line for dip coating, in particular dip painting, objects, in particular vehicle bodies, having
a) at least one dip tank, which may be filled to a certain level with coating fluid;
b) a conveyor system, with the aid of which the objects to be coated may be conveyed towards the dip tank, into the dip tank, out of the dip tank and away from the dip tank, and which has a guide device and at least one transport carriage which may be moved along the guide device and which in turn comprises:
 ba) a drive motor for the movement along the guide device;
 bb) a holding frame to which at least one object may be fixed;
 bc) an immersion device which has at least one rotational or pivot axis and to which the holding frame is fixed;
c) a control device in which a set immersion curve for the object fixed to the holding frame is stored and which controls the movement of the object fixed to the holding frame.

BACKGROUND OF THE INVENTION

Earlier lines for dip coating vehicle bodies used a pendulum conveyor as the conveyor system. In this pendulum conveyor, each vehicle body was supported by two pendulum hangers on a skid connecting the lower ends of the pendulum hangers to one another. The pendulum hangers were in turn fixed at the top to a chain conveyor whereof the elevation in each case determined the local vertical position of the transported vehicle body. In these lines which are, to some extent, still in use today, the construction described meant that there was no risk of the transported vehicle body striking a hard structure adjacent to its movement path, in particular a wall of the dip tank or coating devices, e.g. spray rings, mounted between two dip tanks. Special safety measures for this were not required.

The same applies to the dip coating line described in DE 196 41 048 A1, in which a bogie supporting a vehicle body in each case is pulled along a rail system with the aid of chains and forced to rotate into and out of the dip tank with the aid of a type of mechanical connecting link guide. A collision between the coated vehicle body and a hard structure adjacent to the movement path is also only conceivable here in exceptional cases in which one of the mechanical guide devices fails.

Since both the dip coating lines which operate with a pendulum conveyor and that which is described in DE 196 41 048 A1 have relatively little flexibility, dip coating lines of the type mentioned at the outset have recently gained in importance, for example those described in DE 101 03 837 B4 or also DE 100 29 939 C1. These dip coating lines have in common that they make use of independently movable transport carriages which are provided with separate drive motors and immerse the object supported thereby in the dip tank, and remove it from the dip tank, with the aid of an immersion device. The immersion movement here comprises at least one rotational or pivotal movement about at least one rotational or pivot axis. The linear movement of the transport carriage along the corresponding guide device and the immersion movement may be controlled independently of the corresponding movements of other transport carriages in the line. This gives a flexibility of the overall system which could not be achieved with the earlier lines, in particular those using transport chains.

However, the relatively low number of mechanical positive guides to which the independently movable transport carriages are subject increases the risk of the object to be coated colliding with a hard structure adjacent to the movement path, in particular a wall of the dip tank, in the event of certain system errors, in particular also operating and software errors.

The present invention is directed to resolving these and other matters.

SUMMARY OF THE INVENTION

An object of the present invention is to design a line of the type mentioned at the outset so that the risk of a collision between the object to be coated and a hard structure located on the movement path is, to the greatest extent possible, eliminated.

This object may be achieved according to the invention in that
d) a collision prevention system is provided, which comprises:
 da) a position transducer measuring the absolute value for each possible degree of freedom of movement of the object fixed to the holding frame;
 db) a memory in which the course of a first boundary surface or boundary line is stored, which reproduces the course of the hard structures along the movement path of the object;
 db) a memory in which the course of a second boundary surface or boundary line is stored, which runs at a distance from the first boundary surface or boundary line, wherein an anti-collision area is formed between the first boundary surface or boundary line and the second boundary surface or boundary line;
 dc) a memory in which the course of a contour is stored, which represents the course of the contour of the object fixed to the holding frame;
wherein
e) the control device, from the signals delivered to it by the position transducers and the stored data relating to the course of the second boundary surface or boundary line and relating to the contour representing the object fixed to the holding frame, calculates continuously, or at particular time intervals, whether the contour penetrates the anti-collision area or not and, in the first case, stops the further movement of the object.

According to the invention, the hard structure, which is located on the movement part of the objects and is represented by a boundary surface or boundary line which at least approximates this contour, is therefore surrounded by an anti-collision area whereof the boundary surface or boundary line, which is not physically present, must not be intersected by a contour representing the course of the contour of the object fixed to the holding frame. The term "represent" here refers at least to an approximation of the exact geometry which can be configured for example in the manner of a polygonal line. If the contour in question penetrates the anti-collision area, the further movement of the object is stopped immediately and, if necessary, an alarm is sounded. An impending collision can thus be reliably prevented.

In general, the transport carriage is guided so well in the lateral direction that it is unnecessary to implement any special collision prevention measures in this direction. A two-dimensional observation in a vertical plane incorporating the transport direction, e.g. in the vertical central plane of the object to be coated, is then sufficient. This facilitates the storage of the relevant geometries and reduces the computational complexity for collision checking.

It is expedient if the control device is carried along by the transport carriage. This reduces time delays linked to the transfer of information.

A verification device is advantageously provided, which verifies the correct function of the position transducer. Owing to the high level of damage which can occur in the event of a collision between the object to be coated and a hard structure, it is essential that the collision prevention system operates reliably, and in particular that the position transducers forming the basis of the system operate correctly. The verification device according to the invention aims to ensure this.

For at least some of the position transducers, the verification device can comprise a redundant similar position transducer. As long as both mutually associated position transducers show substantially the same value within a tolerance window, it can be assumed that the position transducers are functioning correctly. However, if the two output signals differ greatly, it must be assumed that there is a fault and the movement of the object must likewise be brought to a standstill.

For at least some of the position transducers, the verification device can also comprise a stationary device past which the object fixed to the holding frame is guided at least once, where its position is determined independently. In this case, the verification device does not operate continuously, but only at intervals, whenever a holding frame with an object fixed thereto is guided past it. However, this is generally sufficient to discover a fault with a position transducer in good time.

The said stationary device can comprise for example a light barrier which is interrupted or cleared when the object to be coated is in a particular position, or an ultrasound sensor or a sensor responding to metal, or a linear scan system or the like.

It is particularly expedient if the width of the anti-collision area is a function of the speed of the object. This takes into account that the path that the object to be coated between the discovery of a fault which may possibly result in a collision and the stopping of the movement increases with the speed of the object.

In this case, where possible, a body-type recognition system should be provided, which automatically recognises the type of vehicle body being coated at that time. This can comprise for example a plurality of light barriers past which the vehicle body is moved in a horizontal and a vertical movement, or an image recognition or code recognition system.

It is to be understood that the aspects and objects of the present invention described above may be combinable and that other advantages and aspects of the present invention will become apparent upon reading the following description of the drawings and detailed description of the invention.

An exemplary embodiment of the invention is explained below with reference to the drawing, which shows.

BRIEF DESCRIPTION OF THE DRAWINGS

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
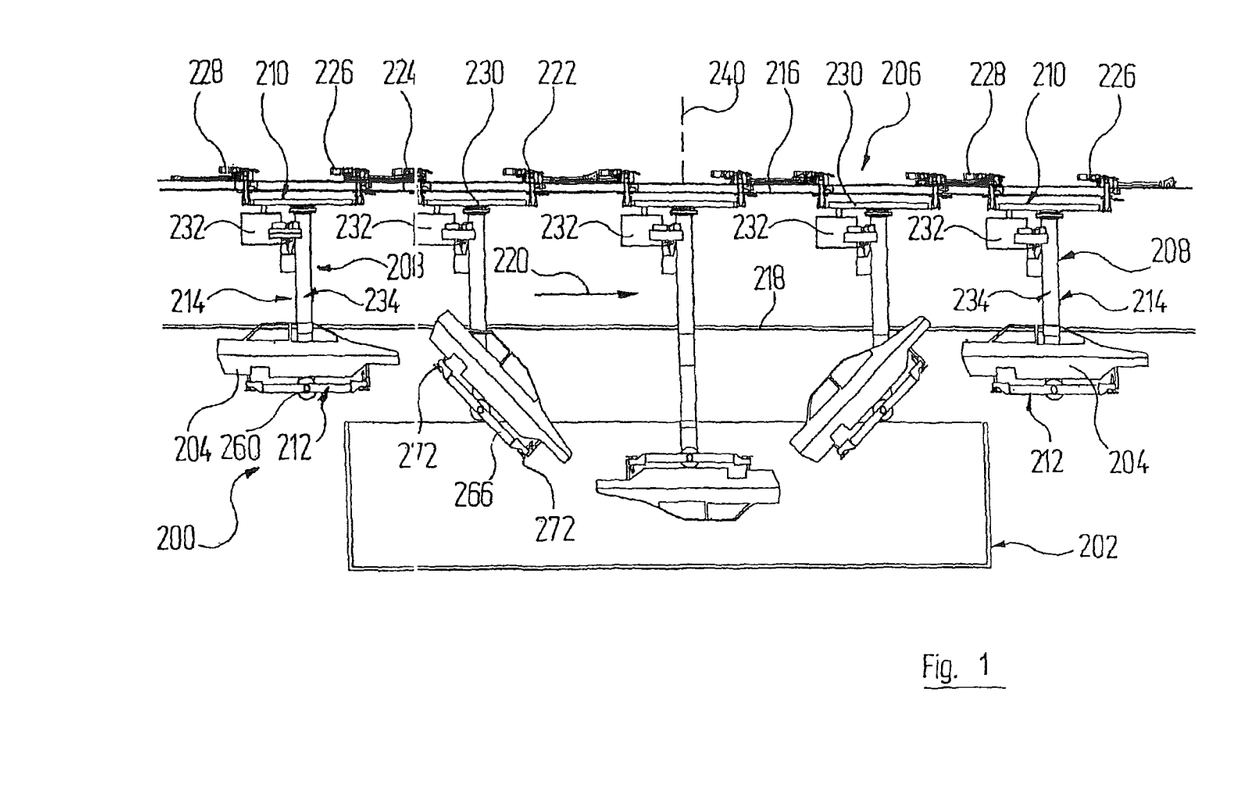
FIG. 1 a side view of a cataphoretic dip coating line for vehicle bodies.
Figure 2:
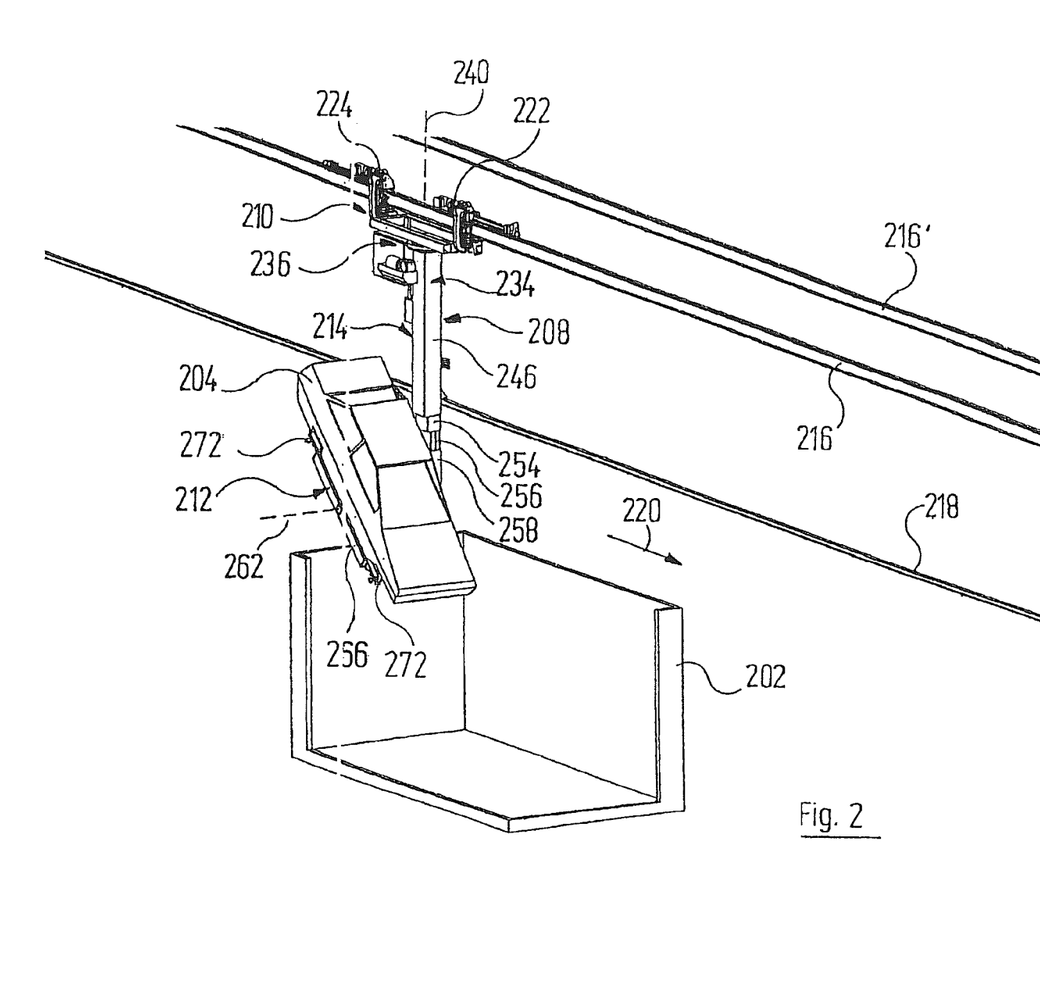
FIG. 2 a perspective view of a transport carriage as used in the dip coating line of FIG. 1, with a vehicle body in the course of immersion into a dip tank.

Reference is firstly made to FIGS. 1 and 2. The cataphoretic dip coating line which is illustrated therein and denoted as a whole by the reference numeral 200 is merely representative of an exemplary embodiment of a dip coating line in which the collision prevention system according to the invention is used. It comprises a dip tank 202 filled with liquid paint. Colour particles migrate in an electric field formed between vehicle bodies 204 and anodes—which are arranged along the movement path of the vehicle bodies 204 and are not shown for reasons of clarity—towards the vehicle bodies 204 and are deposited thereon.

The vehicle bodies 204 are guided along the line, and in particular through the dip tank 202 and the paint contained therein, with the aid of a conveyor system 206. This comprises a plurality of transport carriages 208 which in turn have a drive carriage 210 and a holding frame 212 which are coupled to one another by way of a telescopic device 214 explained in detail below.

A drive rail 216, as used in conventional electric monorail overhead conveyors, extends over the dip tank 202. The movement direction in which the vehicle bodies 204 are conveyed by means of the conveyor system 206 is shown in FIG. 1 by an arrow 220. The drive rail 216 is offset towards the outside with respect to the centre of the dip tank 202, in the direction perpendicular to the plane of the drawing in FIG. 1.

The drive carriages 210 are of a construction which is essentially known from electric monorail overhead conveyors. Each of these drive carriages 210 has a running mechanism 222, known in technical terms as a "leader", which runs in front in the movement direction 220, and a further running mechanism 224, known in technical terms as a "follower", which follows behind in the movement direction 220. Leaders 222 and followers 224 are equipped in known manner with guide and support rollers (not denoted by a separate reference numeral here) which roll along different faces of the I-shaped profile of the drive rail 116. At least one of the rollers of the leader 222 and the follower 224 serves as a drive roller and is rotatable for this purpose by an electric motor 226 and 228.

Leaders 222 and followers 224 of each drive carriage 210 are connected to one another by means of a connecting frame 230. This supports—again in known manner—a control device 232 which can communicate with the central control of the dip coating line 200 and, if applicable, with the control devices 232 of further drive carriages 210 present in the dip coating line 200. This enables substantially independent movement of the different transport carriages 208 and the moving parts mounted thereon.

The telescopic device 214 which couples the drive carriage 210 to the holding frame 212 comprises a three-membered vertically extending telescopic arm 234, whereof the length may be altered. It comprises an upper telescopic member 246, a central telescopic member 254 and a lower telescopic member 256 which are displaceable relative to one another. The motors required for this, which are controlled by the control device 232, are not shown.

A pivot pin 260 is mounted at the lower free end region 258 of the lower telescopic member 256. This pivot pin defines a horizontal rotational axis 262 shown in FIG. 2. The pivot pin 260 can be rotated in both rotational directions about the rotational axis 262 by way of a geared motor 264 (not shown in the drawing) which is carried by the telescopic member 256 and is controlled by the control device 232 of the transport carriage 208.

The holding frame 212 comprises, in known manner, two mutually parallel extending longitudinal beams 266 of which only the beam facing the observer is shown in each case in FIGS. 1 and 2. These are mutually connected in the centre by way of a transverse cross-bar 270. The pivot pin 260 is connected in rotationally-fixed manner to the outer surface of a longitudinal beam 266 of the holding frame 212. Mounted at the ends of the longitudinal beams 266 and 268 are fixing means 272 by which the vehicle body 204 to be coated can be detachably fixed to the holding frame 212 in a manner known per se.

The holding frame 212 is therefore only supported by the pivot pin 260 at one side so that no component of the conveyor system 206 is arranged in the space vertically above the holding frame 212. The risk of the vehicle body 204 being contaminated by dirt, e.g. dust, oil or the like, falling from components of the conveyor system 206 is therefore reduced.

As mentioned above, the telescopic members 246, 254 and 256 of the telescopic arm 234 can be moved relative to one another. To this end, the cross-sections of the individual telescopic members 246, 254 and 256 are constructed complementary to one another in such a way that the central telescopic member 254 can be displaced in guided manner in the upper telescopic member 246 and the lower telescopic member 256 can be displaced in guided manner in the central telescopic member 254.

The "normal" mode of operation of the above-described cataphoretic dip coating line 200 in uninterrupted coating mode is as follows:

In FIG. 1, the vehicle bodies 204 to be coated are conveyed in a substantially horizontal alignment from a pre-coating station in which they are prepared for the coating procedure in known manner by cleaning, degreasing etc. The telescopic members 246, 254 and 256 are moved inside one another here so that the telescopic arm 234 is at its shortest length. The drive carriage 210 of the corresponding transport carriage 208 is conveyed along the drive rail 216 to the dip tank 202 with the aid of the electric motors 226 and 228, whereby the associated holding frame 212 with the vehicle body 204 fixed to it is carried along by way of the telescopic device 214.

When the transport carriage 208 approaches the end wall, located on the entry side, of the dip tank 202, the vehicle body 204 is progressively lowered in that the telescopic arm 234 is extended. As soon as the front of the vehicle body 204 projects over the end wall of the dip tank 202 into the interior of the dip tank 202, the pivot pin 260 and, with it, the holding frame 212 with the vehicle body 204 fixed thereto, is rotated about the rotational axis 262 with the aid of the above-mentioned geared motor. In this phase, therefore, the overall movement of the vehicle body 204 can be regarded as the superposition of three movements, namely a horizontal linear movement (arrow 220) along the drive rail 216, a vertical linear movement corresponding to the longitudinal axis of the telescopic arm 234 and a rotational movement about the rotational axis 262 of the pivot pin 260. Here, the vehicle body 204 "rolls" over the entry-side end wall of the dip tank 202. The corresponding position is shown in perspective in FIG. 2.

With the continued lowering and continued rotation of the vehicle body 204 about the rotational axis 262 of the pivot pin 260, a position is finally achieved in which the vehicle body 204 is substantially vertical. Here, the vehicle body 204 is still relatively close to the entry-side end wall of the dip tank 202. To the extent at which the transport carriage 208 continues to move and therefore the distance between the centre of the vehicle body 204 and the entry-side end wall of the dip tank 202 increases, the pivot pin 260, and with this the vehicle body 204, is rotated further in a clockwise direction so that the vehicle body 204 begins to lie on its back. At the latest at the moment in which the vehicle body 204 is completely "on its back" and therefore horizontal again, the vehicle body 204 is immersed completely into the liquid paint.

The vehicle body 204 is then conveyed in this position further through the dip tank 202 with the aid of the transport carriage 208, until it advances closer to the exit-side end wall of the dip tank 202.

Then begins the removal procedure of the vehicle body 204. This is again represented as a superposition of three movements, namely the horizontal linear movement in the conveying direction 220, the vertical movement along the longitudinal axis of the telescopic arm 234 and the rotational movement about the rotational axis 262 of the pivot pin 260. Here, the vehicle body 204 "rolls" away with the shortening of the telescopic arm 234 and therefore with an upward movement of the holding frame 212 and continuation of the rotational movement over the exit-side end wall of the dip tank 202 until a horizontal position of the freshly coated vehicle body 204 is again achieved downstream of the dip tank 202, as seen in the conveying direction 220.

The movement procedures described take place under the influence of a program which is stored in the control device 232 carried by the different transport carriages 208, possibly with the cooperation of the higher-level central control of the dip coating line 200.

As with all technical devices, faults can also occur in the dip coating line 200 described above. Without the additional measures described below, these can lead to collisions between the vehicle bodies 204 to be coated and hard structures, in particular the walls of the dip tank 202. The said faults can be errors by the operating personnel, for example an incorrectly selected immersion curve for the particular vehicle body being treated, or errors in the programming implemented for the control devices 232. Faults can also occur with so-called "manual runs" in which individual transport carriages 208 with a vehicle body 204 suspended thereon are moved using "manual commands", i.e. without reference to the immersion curve programmed into the control device 232. Finally, unrecognised errors can also be present in the different programs used for the control devices, which errors can have an effect under certain circumstances at an unforeseeable point in time and can impair the correct guidance of the vehicle bodies 204 through the dip coating line 200.

For this reason, the dip coating line 200 described above with reference to FIGS. 1 and 2 is additionally provided with a collision prevention system which is explained below with reference to FIGS. 3 and 4.

This collision prevention system is composed of a "software component" and a "hardware component".

The "software component" contains a collision prevention program which is stored in the control devices 232 of the different immersion carriages 208 and which, in a manner described below, intervenes in the "normal" program governing the uninterrupted movement sequence of the vehicle body 204 to prevent impending collisions.

To this end, the geometric conditions of both the "hard" stationary structures of the dip coating line 200 and also those of the vehicle body 204 to be coated are programmed into the different control devices 232. "Hard" structures refer, in particular, to the walls of the different dip tanks 202, but also to structures which are connected up- or down-stream of the dip tanks 202 or connect two dip tanks 202 to one another. Coating devices, e.g. spray rings, between two dip tanks are also included here. Their position can depend on the type of vehicle body 204 currently being coated.

The geometry of the hard structures is, of course, innately three-dimensional, like that of the vehicle body 204. However, since a reliable lateral guidance of the vehicle bodies 204 is ensured by the drive rail 216, the problem of preventing collisions can be reduced to a two-dimensional observation in a vertical plane incorporating the movement direction 220, as shown for instance in FIGS. 1, 3 and 4. In this two-dimensional observation, surfaces become lines.

Figure 3:
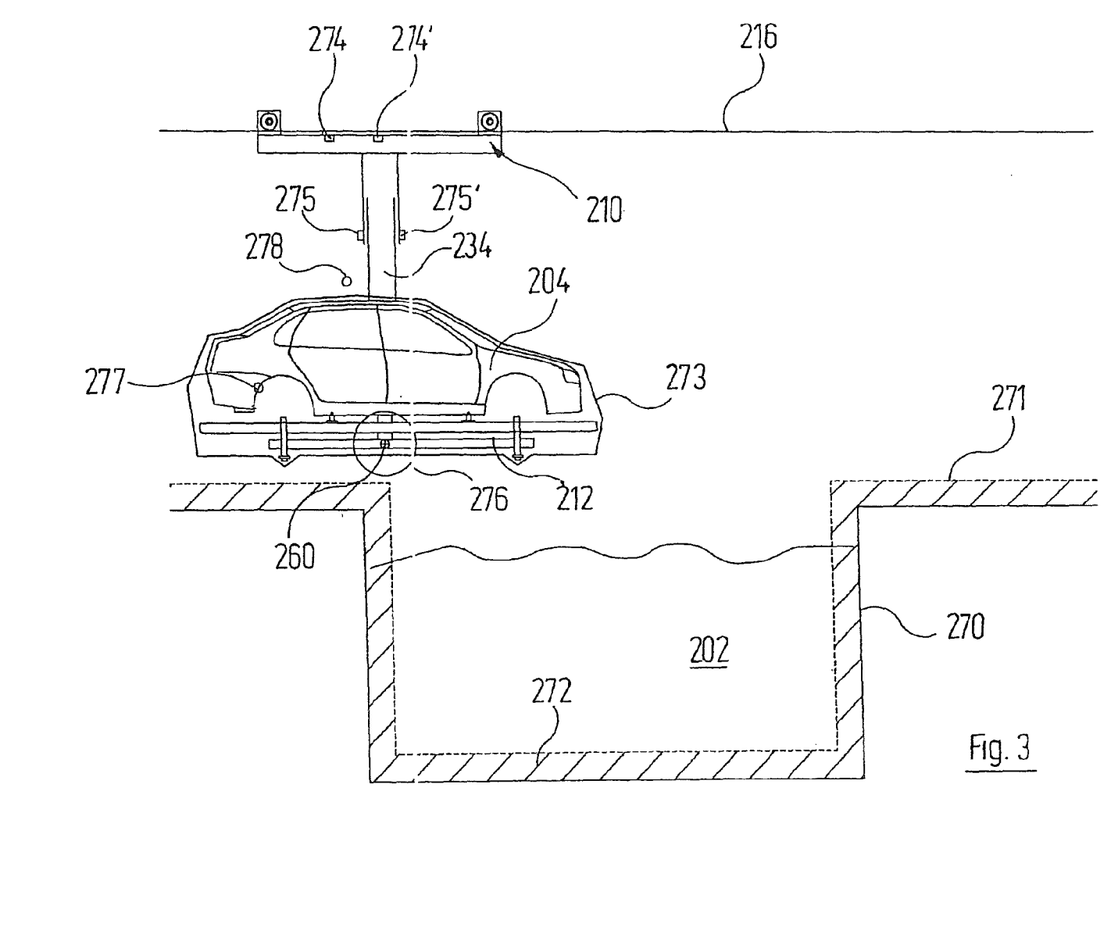
FIG. 3 a schematic side view of a detail of the dip coating line of FIG. 1, equipped for collision prevention, wherein the vehicle body fixed to the transport carriage is not at risk of collision.
Figure 4:
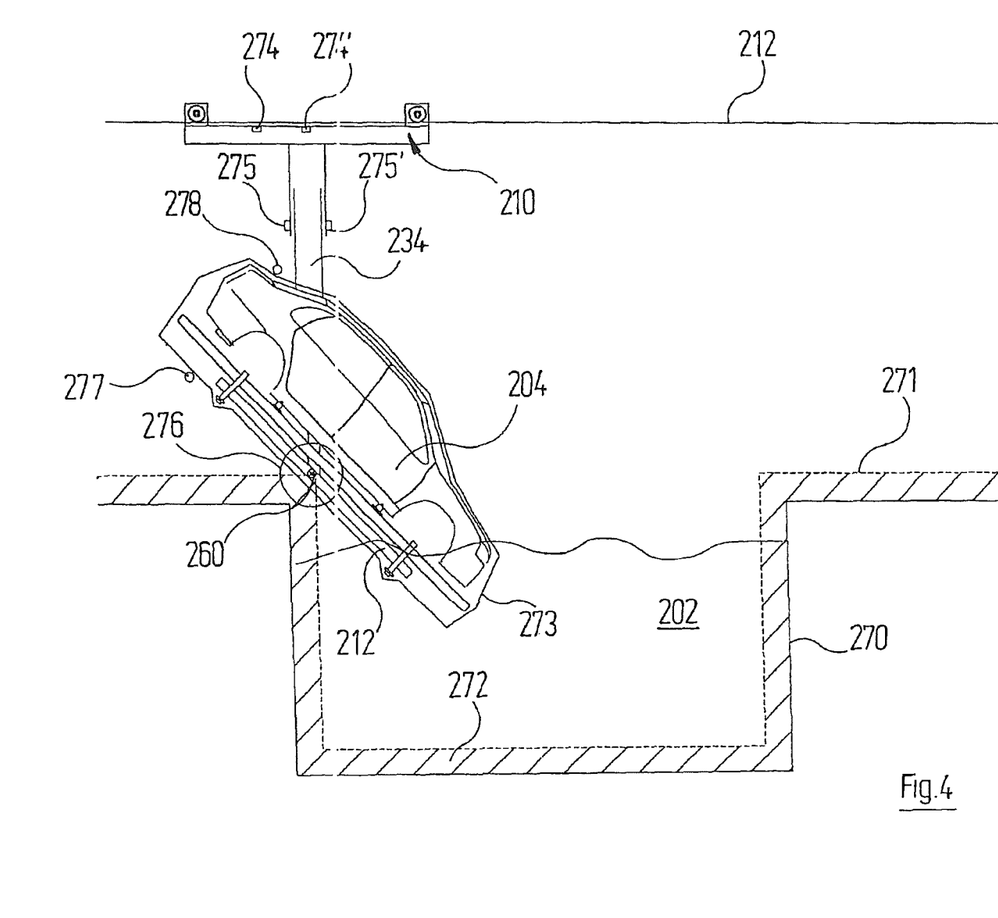
FIG. 4 a view similar to FIG. 3, but in which the vehicle body carried along by the transport carriage is at risk of collision.

The boundary line of the hard structures is denoted in FIGS. 3 and 4 by the reference numeral 270. As mentioned, it is stored in the different control devices 232. Since, as already mentioned above, the boundary line can be dependent on the type of vehicle body 204 being coated, an automatically operating vehicle-type recognition device is connected upstream of the coating-line portion. The boundary line 270 used in each case is selected according to the result of the vehicle-type recognition device.

A boundary line 271 of an anti-collision area 272, which is located between this boundary line 271 and the boundary line 270 of the hard structures, is likewise stored, which boundary line 271 extends parallel to the boundary line of the hard structures 270 and faces the movement path of the vehicle body 204.

The width of the anti-collision area 272, and therefore the distance between the boundary lines 271 and 270 can be fixed or, if required, also dynamic. In the latter case, the width of the anti-collision area 272 increases with the movement speed of the vehicle body 204. The position of the boundary line 271 will then be calculated by the control devices 232 from the position of the boundary line 270 of the hard structures, which is known to the control devices, and the speed of the movement of the vehicle bodies 204, which is already known to the control devices 232. "Movement speed" of the vehicle body 204 can, in the simplest case, be understood to mean the speed component in the horizontal direction; it is safest here to take into account the maximum speed which a point of the vehicle body 204 reaches during the overall movement comprising three superposed movement types.

The geometry of the vehicle bodies 204 fixed to the holding frames 212 is moreover stored in the control devices 232. As indicated in FIGS. 3 and 4, this geometry can, in the two-dimensional observation applied here, be approximated by a polygonal line 273, or another mathematically defined envelope, surrounding the vehicle body 204 and the holding frame 212.

The "hardware component" of the collision prevention system comprises two absolute measurement position transducers 274, 274', 275 for each linear degree of freedom of movement of the conveyor system 206 at each transport carriage 208.

The position transducers for linear movement of the transport carriage 208 along the drive rail 216 in the direction of the arrow 220 can cooperate for example with a code strip, which extends along the drive rail 216 and whereof the codes indicate in each case the point at which they are located. These codes are each read by two reading heads 274, 274' carried along by the transport carriage 208. The reading heads 274, 274' are only indicated very schematically in FIGS. 3 and 4.

Position indicators based on a similar principle, with reading heads 275, 275', are provided on the telescopic arm 234 to record the linear vertical movement. The position of these reading heads 275, 275' which is shown in FIGS. 3 and 4 should be seen as merely symbolic: in a practical configuration, they are arranged inside the telescopic arm 234 so that they are not visible from the outside.

The degree of freedom of movement of the holding frame 212 about the rotational axis 260 is finally monitored by a rotational angle indicator 276 fixed to the holding frame 212. It would essentially be possible for a second, identically designed rotational angle indicator to be associated with this rotational angle indicator 276. In the present case, however, two stationary light barriers 277, 278 are provided instead of a second rotational angle indicator of this type, and these are positioned so that neither is interrupted in a particular position of the vehicle body 204.

To operate the collision prevention system, essentially only the reading heads 274, 275 and the rotational angle indicator 276 are necessary. The further reading heads 274', 275' and the light barriers 277, 278 are redundant and serve for increased reliability.

The collision prevention system described operates in the background of the normal program sequence in the control devices 232 and, in manual operation, in the background of the operating commands specified by the operating personnel as follows:

The control devices 232 of the different supporting carriages 208 each receive information relating to the current position of the supporting carriages 208 on the drive rail 216 from the reading heads 274 associated therewith and information relating to the length of the respective telescopic arm 234, and therefore the height of the respectively associated rotational axis 260, from the reading heads 275. The rotational angle indicator 276 in turns transmits information relating to the angular position which the holding frame 212 with the vehicle body 204 assumes about the rotational axis 260. From this information, and from the information relating to the boundary line 271 of the anti-collision area 272 and the idealised contour 273 of the vehicle body 204 fixed to the holding frame 212, which is stored in the control devices 232, the control devices 232 now calculate whether the idealised contour 273 is located outside the anti-collision area, as shown in FIG. 3, or has penetrated the anti-collision area 272, as shown in FIG. 4. In the latter case, the control device 232 emits an alarm and brings the further movement of the vehicle body 204 to an immediate stop by overriding the normal program. The impending collision between the vehicle body 204 and the hard structure symbolised by the boundary line 270 is thus prevented.

The outlined transfer of information from the different absolute measurement position transducers 274, 275 and 276 and the calculations associated therewith can be carried out substantially in real time at specific short intervals.

The redundant reading heads 274', 275' and the light barriers 277, 278 are provided to prevent the collision prevention system becoming inoperative in the event of a failure of a position transducer 274, 275 or 276. The information transmitted by the reading head pairs 274, 274', 275, 275' can be simultaneously retrieved and compared; if the information shows deviations greater than a predetermined tolerance window, an alarm is likewise emitted and the further movement of the vehicle body 204 is stopped. The mode of operation of the rotational angle indicator 276 is monitored in that the continuity of the light barrier 277, 278 is checked at a point in time at which the absolute measurement position transducers 274, 275 and 276 signal a position of the vehicle body 204 in which the continuity of these light barriers 277, 278 has to be present. However, if one of these light barriers 277, 278 is interrupted at this point in time, this means that one of the absolute measurement position transducers 274, 275 or 276 is out of order. An alarm is also triggered in this case and the further movement of the vehicle body 204 is stopped immediately.

The collision prevention system described above can advantageously not only be used in the concretely described conveyor system 206, but wherever objects, in particular vehicle bodies, are to be introduced into a dip tank, and removed from this again, by the superposition of at least one linear movement and at least one rotational or pivotal movement.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A line for dip coating objects comprising:
   at least one dip tank, which is capable of being filled to a certain level with coating fluid;
   a conveyor system, which conveys the objects to be coated towards the at least one dip tank, into the at least one dip tank, out of the at least one dip tank and away from the at least one dip tank, and which has a guide device and at least one transport carriage which is capable of being moved along the guide device and which in turn comprises:
      a drive motor for a movement along the guide device;
      a holding frame to which at least one object is capable of being fixed;
      an immersion device which has at least one rotational or pivot axis and to which the holding frame is fixed;
   a control device in which a set immersion curve of the at least one object fixed to the holding frame is stored and which controls a movement of the at least one object fixed to the holding frame;
   a collision prevention system which comprises:
      a position transducer for measuring an absolute value for each possible degree of freedom of movement of the at least one object-fixed to the holding frame;
      a memory in which a course of a first boundary surface or boundary line is stored, which reproduces a course of hard structures along a movement path of the at least one object;
      a memory in which a course of a second boundary surface or boundary line is stored, which runs at a distance from the first boundary surface or boundary line, wherein an anti-collision area is formed between the first boundary surface or boundary line and the second boundary surface or boundary line;
      a memory in which a course of a contour is stored, which represents a course of a contour of the at least one object fixed to the holding frame; and, wherein
      the control device, from signals delivered to the control device by the position transducer and the stored data relating to the course of the second boundary surface or boundary line and relating to the contour representing the at least one object fixed to the holding frame, calculates a position of the boundary line continuously or at particular time intervals and whether the contour penetrates the anti-collision area or not and, in the first case, stops a further movement of the object.

2. The line for dip coating according to claim 1, wherein the control device is carried along by the transport carriage.

3. The line for dip coating according to claim 2, wherein a verification device is provided, which verifies a correct function of the position transducer.

4. The line for dip coating according to claim 3, wherein the verification device comprises a redundant similar position transducer.

5. The line for dip coating according to claim 3, wherein the verification device comprises a stationary device past which the at least one object fixed to the holding frame is guided at least once, where its position is determined independently.

6. The line for dip coating according to claim 5, wherein the stationary device comprises at least one light barrier.

7. The line for dip coating according to claim 1, wherein the width of the anti-collision area is a function of a speed of the at least one object.

8. The line for dip coating according to claim 1, further comprising: an automatically-operating body-type recognition device.

9. The line for dip coating according to claim 1, further comprising: a verification device which verifies a correct function of the position transducer.

10. The line for dip coating according to claim 9, wherein the verification device comprises a redundant similar position transducer.

11. The line for dip coating according to claim 9, wherein the verification device comprises a stationary device past which the at least one object fixed to the holding frame is guided at least once, where its position is determined independently.

12. The line for dip coating according to claim 11, wherein the stationary device comprises at least one light barrier.

13. The line for dip coating of claim 9 further comprising: an automatically-operating body-type recognition device.

14. The line for dip coating of claim 9 wherein the width of the anti-collision area is a function of a speed of the at least one object.

* * * * *